Patented Apr. 11, 1939

2,153,704

UNITED STATES PATENT OFFICE 2,153,704

PROCESS FOR THE RECOVERY OF GLYCERIN

Karl Werner, Neu Isenburg, Frankfort-on-the-Main, Germany, assignor to Deutsche Gold- und Silber-Scheideanstalt vormals Roessler, a corporation of Germany No Drawing. Application July 16, 1938, Serial No. 219,663. In Germany July 16, 1937

6 Claims. (Cl. 260—637)

The present invention relates to an improved process for the recovery of glycerin from mixtures containing glycerin obtained by the fermentation of vinasse, sugars or other carbohydrate-containing substances.

It is well known that glycerin may be obtained by the fermentation of vinasse, sugars or other carbohydrate-containing substances under conditions which favorably influence the formation of glycerin. However, the known processes for the recovery of glycerin from the resulting fermentation products have been commercially impractical as the previous processes required numerous complicated treatments to separate the glycerin from the other fermentation products. Both fractional distillation of the fermented liquors and extraction of the liquors have previously been used but found impracticable.

The known extraction processes are not practical as the previously employed extracting agents were not sufficiently selective to effect efficient separation of the glycerin from the remaining products of the fermentation. Such solvents of glycerin as ethyl alcohol, acetone, ethyl acetate, carbon tetrachloride and amyl alcohol have been found entirely unsatisfactory for simple extraction of the glycerin from the mixtures obtained by the fermentation of carbohydrates.

It was found, in accordance with the present invention, that fermented vinasse and the like products containing glycerin, may easily be worked up to recover glycerin therefrom, by extracting the crude products with pyridine. If the starting material contains too much water, it is preferable to dry it to a certain extent. However, complete drying is not preferable as it may be unfavorable for the subsequent extraction. The fermented starting material may for example be mixed with inert diluents such as kieselguhr, alumina, sawdust and the like, and then be dried until the mixture contains a relatively small quantity of water and subsequently extracting such product with pyridine. It is however, also possible to free the starting material either entirely or partly of its water content and then extracting the resulting liquor, containing, for example, 30% water, with pyridine in apparatus suitable for the extraction of liquids.

It is possible to obtain a substantially complete separation of the glycerin from the other materials contained in the fermentation product by such extraction with pyridine. The actual yield of glycerin naturally depends upon the extraction method employed and the amount of pyridine employed. It is advantageous to carry out the extraction countercurrently, as for example, as in the diffusion batteries employed in the sugar industry.

The extraction agent, pyridine, employed in accordance with the present invention, need not be in absolutely pure form. It is possible to employ crude pyridine and mixtures containing pyridine. However, these should not contain high boiling products which would prove hard to separate from glycerin by distillation.

When the pyridine which is recovered from the extract contains too great a quantity of water, the water may be removed partly or entirely by treatment with substances capable of withdrawing the water or by azeotropic distillation.

The raw glycerin recovered by the extraction with pyridine and subsequent removal of the pyridine generally still possesses a more or less brownish coloring but is sufficiently pure that it possesses the commercial requirements after a simple purification as for example, fractionation.

If a completely decolorized glycerin is desired, it may easily be obtained from the glycerin obtained in accordance with the present invention by filtering it hot after dilution with water through activated charcoal. Even though decolorization with activated charcoal is known, it must be noted that in the present instance, the purification and decolorization is only possible if the process is carried out in the manner specified. The glycerin obtained in this manner may, if desired, be fractionated with superheated steam or fractionated under vacuum.

The following example serves to illustrate the present invention but the invention is not restricted thereto.

Example

A fermented vinasse of the following general composition was employed:

| | Percent |
|---|---|
| Water | 40 |
| Glycerin | 30 to 35 |
| Betaine-like impurities | 20 |
| Other impurities including salts | 15 |
| | 20 to 35 |

This material was treated with pyridine in a glass column heated upon a water bath, and a thorough mixture was obtained by stirring. After allowing the mixture to stand and decanting the extract the remaining portion was again extracted two or three times with pyridine.

The combined extracts were distilled to remove the water and pyridine and then the glycerin was distilled off under vacuum. The yield amounted to 90% to 93% of the amount of glycerin in the starting material. The glycerin distilled over at 170° C. to 200° C.

The glycerin obtained was further purified by the following treatment:

The raw glycerin containing about 15% water was diluted with an equal volume of water and heated to the boiling point. The boiling hot solution was then filtered through 10 grams of decolorizing charcoal in a filtering funnel heated with boiling water. This decolorizing treatment was repeated once and a substantially colorless product was obtained. By the concentration of this aqueous glycerin solution, a glycerin was obtained which meets the requirements of dynamite glycerin.

While I have described herein some embodiments of my invention, I wish it to be understood that I do not wish to limit myself thereby except within the scope of the appended claims.

I claim:

1. In a process for the recovery of glycerin from fermentation products containing glycerin, the step comprising extracting the glycerin from such products with pyridine.

2. In a process for the recovery of glycerin from aqueous mixtures containing glycerin and betaine-like substances, the step comprising extracting the glycerin from such mixtures with pyridine.

3. In a process for the recovery of glycerin from fermented vinasse containing glycerin in admixture with other products of fermentation, the step comprising extracting the glycerin from such mixtures with pyridine.

4. In a process for the recovery of glycerin from aqueous fermentation products containing glycerin, the step comprising extracting the glycerin from such aqueous products with pyridine.

5. In a process for the recovery of glycerin from aqueous fermentation products containing glycerin, the steps comprising adjusting the water content of such products to 30-35% and then extracting the glycerin therefrom with pyridine.

6. In a process for the recovery of glycerin from fermentation products containing glycerin, the steps comprising extracting such products with pyridine, distilling the extract to recover the glycerin contained therein, diluting the recovered glycerin with water, heating the diluted glycerin and contacting such heated solution with activated charcoal.

KARL WERNER.